United States Patent
Fournier et al.

(10) Patent No.: US 9,902,620 B2
(45) Date of Patent: *Feb. 27, 2018

(54) PRODUCTION OF PRECIPITATED SILICA EMPLOYING A FAST BLENDER

(71) Applicant: RHODIA OPERATIONS, Aubervilliers (FR)

(72) Inventors: Elise Fournier, Rueil Malmaison (FR); Jean-Claude Magne, Butry/Oise (FR); Francois Nicol, Paris (FR)

(73) Assignee: Rhodia Operations, Aubervilliers (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/509,899

(22) Filed: Oct. 8, 2014

(65) Prior Publication Data

US 2015/0125376 A1 May 7, 2015

Related U.S. Application Data

(63) Continuation of application No. 12/520,576, filed as application No. PCT/EP2007/064473 on Dec. 21, 2007, now abandoned.

(30) Foreign Application Priority Data

Dec. 22, 2006 (FR) ...................................... 06 11289

(51) Int. Cl.
  *C01B 33/00* (2006.01)
  *C01B 33/12* (2006.01)
  *C01B 33/193* (2006.01)

(52) U.S. Cl.
  CPC .......... *C01B 33/128* (2013.01); *C01B 33/193* (2013.01)

(58) Field of Classification Search
  CPC ........................... C01B 33/128; C01B 33/193
  USPC .................................................. 423/335–340
  See application file for complete search history.

(56) References Cited

U.S. PATENT DOCUMENTS

| | | | |
|---|---|---|---|
| 2,871,099 A | 1/1959 | Ziese | |
| 3,034,914 A | 5/1962 | Lagerstrom | |
| 3,108,892 A | 10/1963 | Krinov | |
| 7,250,463 B2 | 7/2007 | Durel et al. | |
| 2005/0032965 A1 | 2/2005 | Valero et al. | |

FOREIGN PATENT DOCUMENTS

| | | |
|---|---|---|
| FR | 1140609 | 7/1957 |
| FR | 1307158 | 10/1962 |
| FR | 2880351 A1 | 7/2006 |
| GB | 2125780 A | 3/1984 |
| WO | 03016215 A1 | 2/2003 |
| WO | 03016387 A1 | 2/2003 |

*Primary Examiner* — Steven Bos (57) ABSTRACT

A unique method for preparing precipitated silica entails reacting a silicate with an acidifying agent to obtain a suspension of precipitated silica, and separating and drying the suspension, and further wherein the precipitation includes contacting a silicate with an acidifying agent in an acidic medium in a fast blender.

31 Claims, 1 Drawing Sheet

PRODUCTION OF PRECIPITATED SILICA EMPLOYING A FAST BLENDER

CROSS-REFERENCE TO EARLIER APPLICATIONS

This application is a continuation of application Ser. No. 12/520,576, filed Oct. 5, 2009, which is a national phase of PCT/EP2007/064473, filed Dec. 21, 2007 and designating the United States (published in the French language on Jul. 3, 2008, as WO 2008/077948 A1; the title and abstract were also published in English), which claims priority under 35 U.S.C. § 119 of FR 0611289, filed Dec. 22, 2006, each hereby expressly incorporated by reference in its entirety and each assigned to the assignee hereof The present invention relates to a novel method for preparing precipitated silica, in particular using a fast blender.

The use of precipitated silica is known as a catalyst support, as an absorbent for active materials (in particular supports for liquids, for example used in foods, such as vitamins (in particular vitamin E), choline chloride), as a viscosifying, texturizing or anti-caking agent, as an element for battery separators, as a toothpaste and paper additive, etc.

Precipitated silica can also be employed as a reinforcing filler in silicon matrices (for example for coating electrical cables) or in compositions based on polymer(s), in particular elastomer(s).

Methods obtaining precipitated silica conventionally involve adding the reactants to a stirred reactor (vessel). These methods may have drawbacks, in particular when the precipitation operation comprises the simultaneous addition of silicate and acidifying agent in acidic medium.

This simultaneous addition step is often difficult to control, thereby substantially reducing the reliability of the method, or even making it really unreliable and therefore not robust.

In general, the precipitation of silica in these methods comprises rather fast reaction steps, whose control may depend in particular on the mixing quality of the reactants and hence the mixing performance of the reactor. Due to the speed of the reactions, the stirred reactor may display wide heterogeneities in the concentration of the reactants and of the products.

Furthermore, the productivity of these methods is not always satisfactory, particularly due to the sensitivity of the properties of the product to the reactant introduction rate.

The invention proposes a novel method for preparing precipitated silica which constitutes an alternative to the known methods for preparing precipitated silica and which advantageously serves to remedy the abovementioned drawbacks.

Thus, the present invention proposes a method for preparing precipitated silica, of the type comprising reacting a silicate with an acidifying agent for obtaining a suspension of precipitated silica, and separating and drying this suspension, characterized in that the precipitation comprises contacting (mixing) a silicate with an acidifying agent in acidic medium (the reaction medium has an acidic pH), in a fast blender.

The invention also proposes a method for preparing precipitated silica, of the type comprising reacting a silicate with an acidifying agent for obtaining a suspension of precipitated silica, and separating and drying this suspension, characterized in that the precipitation comprises contacting (mixing) a silicate with an acidifying agent in acidic medium (the reaction medium has an acidic pH), in a turbulent flow zone.

Preferably, said contacting (mixing) of a silicate with an acidifying agent is carried out at a pH of between 2 and 5.5, preferably between 2 and 5.

This introduction of the silicate into the fast blender (or into the turbulent flow zone) is generally carried out continuously.

Advantageously, the reaction medium resulting from the contacting of the silicate with the acidifying agent is led to a reactor, preferably subject to stirring, said reactor generally operating in semi-continuous mode. In this reactor, at least one aggregation/growth of the silica particles formed generally takes place.

Thus, advantageously, in the method according to the invention, a reactor (vessel) preferably stirred, is placed in series after the fast blender.

The fast blender may in particular be selected from symmetrical T or Y blenders (or tubes), asymmetrical T or Y blenders or tubes), tangential jet blenders, Hartridge-Roughton blenders, vortex blenders, rotor-stator blenders.

Symmetrical T or Y blenders (or tubes) generally consist of two opposing tubes (T tubes) or tubes making an angle smaller than 0 to 180° (Y tubes), having the same diameter, discharging into a central tube having an identical or higher diameter than that of the preceding two tubes. They are said to be symmetrical because the two reactant injection tubes have the same diameter and the same angle to the central tube, the device being characterized by an axis of symmetry. Preferably, the central tube has a diameter about two times higher than the diameter of the opposing tubes; similarly, the speed of the fluid in the central tube is preferably equal to half of that in the opposing tubes.

It is nevertheless preferred, in particular when the two fluids to be introduced do not have the same flow rate, to employ an asymmetrical T or Y blender (or tube) rather than a symmetrical T or Y blender (or tube). In asymmetrical devices, one of the fluids (generally the fluid with the lower flow rate) is injected into the central tube via a side tube having a smaller diameter. The latter generally makes a 90° angle with the central tube (T tube) this angle may be different from 90° (Y tube), producing cocurrent systems (for example 45° angle) or countercurrent systems (for example 135° angle) with regard to the other stream.

Very advantageously, the method according to the present invention makes use of a tangential jet blender, a Hartridge-Roughton blender or a vortex blender (or precipitator), which are derived from symmetrical T devices.

More particularly, in the method according to the invention, the contacting of a silicate with an acidifying agent is carried in a tangential jet, Hartridge-Roughton or vortex blender, comprising a chamber having at least two tangential inlets via which the silicate and acidifying agent enter separately (but simultaneously), and an axial outlet via which the reaction medium exits, preferably to a reactor (vessel) placed in series after said blender. The two tangential inlets are preferably located symmetrically, and in opposition, about the centerline of said chamber.

The chamber of the tangential jet, Hartridge-Roughton or vortex blender used generally has a circular cross section and preferably a cylindrical shape.

Each tangential inlet, tube may have an inside diameter d of 0.5 to 80 mm.

This inside diameter d may be between 0.5 and 10 mm, in particular between 1 and 9 mm, for example between 2 and 7 mm. However, particularly at industrial scale, it is preferably between 10 and 80 mm, in particular between 20 and 60 mm, for example between 30 and 50 mm.

The inside diameter of the chamber of the tangential jet, Hartridge-Roughton or vortex blender employed may be between 3 d and 6 d, in particular between 3 d and 5 d, for example equal to 4 d; the inside diameter of the axial outlet tube may be between 1 d and 3 d, in particular between 1.5 d and 2.5 d, for example equal to 2 d.

The flow rates of silicate and acidifying agent are determined for example so that at the point of confluence, the two reactant streams enter into contact with one another in a sufficiently turbulent flow zone.

The method according to the present invention generally does not comprise any (formation of) initial vessel heel.

According to a particularly advantageous and preferred embodiment of the invention, the precipitation is carried out as follows:

(i) silicate and acidifying agent are added simultaneously to said fast blender, preferably in continuous mode, the pH of the reaction medium ($pH_1$) being between 2 and 5.5, in particular between 2 and 5, (ii) the reaction medium issuing from step (i) is introduced into at least one stirred reactor, in particular in semi-continuous mode, the pH of the reaction medium ($pH_2$) in the reactor being regulated between 2 and 5.5, in particular between 2 and 5, preferably with $pH_2 \geq pH_1$, (iii) silicate is added to the reaction medium issuing from step (ii), in the stirred reactor, until the pH value of the reaction mixture obtained is between 7 and 10, in particular between 7.5 and 9.5, (iv) silicate and acidifying agent are added simultaneously to the reaction medium issuing from step (iii), in the stirred reactor, that the pH of the reaction medium is maintained between 7 and 10, in particular between 7.5 and 9.5.

(v) the silicate addition is interrupted while continuing to add acidifying agent to the reaction medium of the stirred reactor until the pH value of the reaction medium obtained in the stirred reactor is lower than 5, preferably between 3 and 5.5, for example between 3 and 5.

It has accordingly been found that the succession of particular steps, and in particular the presence of a first simultaneous addition of acidifying agent and silicate in acidic medium at pH between 2 and 5.5 in fast blender, in particular of the tangential jet, Hartridge-Roughton or vortex type, the feeding of a stirred reactor with the reaction medium issuing from this fast blender, and the presence of a second simultaneous addition of acidifying agent and silicate in basic medium at pH between 7 and 10, constitute important conditions for obtaining an efficient and advantageous method and better control of the properties of the precipitated silica obtained.

The acidifying agent and silicate employed in step (i) are preferably diluted, and for example prepared by dilution and heating in line of the generally more concentrated acidifying agent and silicate used in the other steps of the inventive method.

As acidifying agent, use is generally made of strong inorganic acid such as sulfuric acid, nitric acid or hydrochloric acid, or an organic acid such as acetic acid, formic acid or carbonic acid.

The normality of the acidifying agent may be between 0.1 and 36 N, for example between 0.2 and 1.5 N.

In particular, in the case in which the acidifying agent is sulfuric acid, its concentration, in step (i), may be between 5 and 50 g/l, for example between 10 and 35 g/l, and its concentration, in the other steps, may be between 40 and 180 g/l, for example between 50 and 130 g/l.

Any common form of silica can also be used as silicate, such as metasilicates, disilicates and advantageously, an alkali metal silicate, in particular sodium or potassium silicate.

In step (i), the silicate may have a concentration (expressed as $SiO_2$) of between 5 and 100 g/l, for example between 20 and 90 g/l, in particular between 25 and 80 g/l; its concentration (expressed as $SiO_2$), in the other steps, may be between 40 and 330 g/l, for example between 60 and 300 g/l, in particular between 60 and 260 g/l.

In general, sulfuric acid is employed as acidifying agent, and sodium silicate as the silicate.

In the case in which sodium silicate is used, it generally has a $SiO_2/Na_2O$ weight ratio of between 2.5 and 4, in particular between 3.2 and 3.8, for example between 3.4 and 3.7.

The reaction of the silicate with the acidifying agent takes place very specifically according to the following steps.

At the first step (step (i)) consists of a simultaneous addition of silicate and acidifying agent in a fast blender, preferably in continuous mode, at a pH ($pH_1$) of between 2 and 5.5, in particular between 2 and 5.

Preferably, this simultaneous addition is carried out so that (in particular at such flow rates) the reaction medium in the internal blender has a pH ($pH_1$) of between 2.5 and 5, in particular between 3 and 4.5; this pH is for example between 3.5 and 4.5 ($pH_1=4.0\pm0.5$).

Similarly, highly advantageously, a tangential jet blender is used in this embodiment of the present invention, and even more preferably, a Hartridge-Roughton blender or a vortex blender (precipitator).

More particularly, in this embodiment of the inventive method, the contacting of the silicate with an acidifying agent is carried in a tangential jet, Hartridge-Roughton or vortex fast blender, comprising a chamber having at least two tangential inlets via which the silicate and acidifying agent enter separately (but simultaneously), and an axial outlet via which the reaction medium exits, preferably to a reactor (vessel) placed in series after said blender. The two tangential inlets are preferably located symmetrically, and in opposition, about the centerline of said chamber.

The chamber of the tangential jet, Hartridge-Roughton or vortex blender used generally has a circular cross section and preferably a cylindrical shape.

Each tangential inlet tube may have an inside diameter d of 0.5 to 80 mm.

This inside diameter d may be between 0.5 and 10 mm, in particular between 1 and 9 mm, for example between 2 and 7 mm. However, particularly at industrial scale, it is preferably between 10 and 80 mm, in particular between 20 and 60 mm, for example between 30 and 50 mm.

The inside diameter of the chamber of the tangential jet, Hartridge-Roughton or vortex blender employed may be between 3 d and 6 d, in particular between 3 d and 5 d, for example equal to 4 d; the inside diameter of the axial outlet tube may be between 1 d and 3 d, in particular between 1.5 d and 2.5 d, for example equal to 2 d.

An electrolyte may optionally be used in step (i). However, preferably, no electrolyte is added during the preparation method, in particular in step (i).

The term electrolyte is understood here in its normal acceptation, that is meaning any ionic or molecular substance which, when in solution, decomposes or dissociates to form ions or charged particles. Mention can be made as electrolyte of a salt of the group of alkali metal or alkaline earth metal salts, in particular the metal salt of the starting silicate and of the acidifying agent, for example sodium chloride in the case of the reaction of a sodium silicate with hydrochloric acid or, preferable, sodium silicate in the case of the reaction of a sodium silicate with sulfuric acid.

Even though it may optionally be considered, ultrasonic treatment, in particular during the contacting of the reactants in the fast blender, is unnecessary and is preferable not employed.

Advantageously, in a second step (step (ii)), the reaction medium resulting from the contacting of the silicate and with the acidifying agent is fed to a reactor (vessel), subject to stirring, this reactor (vessel) generally operating in semi-continuous mode.

Thus, advantageously, in the inventive method, a stirred reactor (vessel) is placed in series after the fast blender.

The pH of the reaction medium ($pH_2$) in the reactor (vessel) subjected to stirring is regulated between 2 and 5.5, in particular between 2 and 5, in particular between 2.5 and 5, for example between 3 and 4.5, or even better 4 and 4.5; this pH ($pH_2$) may be equal to 4.4±0.1.

It is possible to have $pH_2 < pH_1$, but preferably, $pH_2 \geq pH_1$.

In this embodiment in particular, the inventive method generally does not comprise any (formation of) initial vessel heel; but this is not always the case: thus, even if this is not a highly preferred alternative, the stirred reactor may optionally comprise, prior to the addition of the reaction medium issuing from step (i), aqueous vessel heel having a pH of between 2 and 5.5, in particular between 2 and 5.

In step (ii), in order to regulate the pH of the reaction medium ($pH_2$) in the stirred reactor to the desired value, between 2 and 5.5, in particular between 2 and 5, especially between 2.5 and 5, acidifying agent or rather, preferably, silicate or a basifying agent (such as sodium hydroxide), can be added simultaneously to the reaction medium issuing from the fast blender.

The pH measurement, both in the and/or at the outlet of the fast blender and in the stirred reactor, must be particularly reliable and therefore make use of appropriate pH probes/electrodes. For measuring the pH at the outlet of the fast blender, use can be made for example of a Mettler Ingold 3200 probe or electrode, and for measuring the pH in the stirred reactor, a Mettler Ingold 4800 probe or electrode.

Then, in a step (iii), silicate is added to the reaction medium in the reactor, with stirring, in order to obtain a pH value of the reaction medium between 7 and 10, preferably between 7.5 and 9.5.

Although preferably unnecessary, a maturation of the reaction medium may optionally be carried out just after this step (iii) and hence just after the interruption of the silicate addition, particularly at the pH obtained on completion of step (iii), and in general with stirring; this maturation may, for example, last 2 to 45 minutes, in particular 5 to 25 minutes, and preferably not comprise any addition of acidifying agent nor silicate addition.

After step (iii), and the optional maturation, a new simultaneous addition of acidifying agent and silicate is carried out, so that (in particular at such flow rates) the pH value of the reaction medium is maintained between 7 and 10, preferably between 7.5 and 9.5. This second simultaneous addition (step (iv)) is advantageously carried out in such a way that the pH of the reaction medium is constantly equal (to within ±0.2) to the pH reached on completion of the previous step.

Finally, in a step (v), the silicate addition is interrupted while continuing to add acidifying agent to the reaction medium in order to obtain a pH value of the reaction medium lower than 6, preferably between 3 and 5.5, in particular between 3 and 5, for example between 3.5 and 5.

Although preferably unnecessary, a maturation of the reaction medium may be carried out after this step (v) and hence just after interrupting the addition of acidifying agent, particularly at the pH obtained on completion of step (v), and in general with stirring; this maturation may for example last 2 to 45 minutes, in particular 5 to 20 minutes and preferably not comprise any addition of acidifying agent nor any silicate addition.

The reaction chamber in which all the steps (ii) to (v) are carried out is equipped with a stirring unit and, generally, appropriate heating equipment.

The entire precipitation is preferably carried out between 70 and 95° C., in particular between 75 and 95° C.

According to an alternative of the invention, the entire reaction of silicate with acidifying agent is carried out at a constant temperature, usually between 70 and 95° C., in particular between 75 and 95° C.

According to a preferred alternative of the invention, the temperature at the end of the reaction is higher than the temperature at the start of the reaction: thus, the temperature at the start of the reaction is maintained (for example during steps (i) and (ii), the temperature in step (ii) generally being equal to or higher than that of step (i) preferably between 70 and 86° C., for example between 70 and 85° C. or between 76 and 86° C., and the temperature is then increased (for example during step (iii)), preferably to a value of between 85 (or 86) and 95° C., at which it is maintained (for example during steps (iv) and (v)) until the end of the reaction.

In the method according to the invention, in particular according to the preferred embodiment, the contacting of the starting reactants (acidifying agent and silicate) is very uniform and very fast; all the reactants preferably react in the same way. The residence time in the turbulent flow zone or through the fast blender (internal volume of the blender/total flow rate of the starting reactants) is advantageously shorter than 1 second, in particular shorter than 0.5 second, for example no longer than 0.3 second, or even no longer than 0.1 second; it is generally longer than 0.001 second, particularly longer than 0.01 second, for example longer than 0.03 second. More particularly during an industrial implementation, this residence time in the fast blender may be between 0.04 and 0.3 second, for example between 0.05 and 0.25 second. Advantageously, upon the lapse of this residence time, at least 95% preferably at least 99%, by volume of the mixture is uniform.

The stirring rate in the reactor (vessel), particularly in the preferred embodiment of the invention, may for example be between 60 and 700 rpm, in particular between 75 and 300 rpm.

The inventive method allows control of the step of simultaneous addition of the starting reactants and thereby serves to feed the stirred reactor with a uniform reaction medium, making it possible to eliminate the difficulties of as method in which the precipitation operation is entirely carried out in a stirred reactor.

One of the advantages of the inventive methods, in particular according to the preferred embodiment of the invention (in which the step of simultaneous addition of the starting reactants generally rather relatively short), is that, in combination with other specific steps, with the use of a fast blender, in particular a tangential jet, Hartridge-Roughton or vortex blender, placed in series before the reactor, it serves to eliminate in particular the heterogeneities found in a method in which the precipitation operation is entirely carried out in a stirred reactor; a decrease in the time of introduction of the starting reactants is observed, as well as better process control and silica properties.

In particular, the method according to the preferred embodiment of the invention is a reliable, robust method, allowing control of the quality of the silica prepared, and advantageously has very satisfactory productivity.

On completion of the store described above, a silica slurry is obtained, which is then separated (liquid-solid separation).

The separation carried out in the preparation method according to the invention usually comprises a filtration, followed by a washing if necessary. The filtration takes place by any appropriate method, for example using a filter press, a belt filter, a vacuum filter.

The silica suspension thus recovered (filter cake) is then dried.

This drying can be carried out by any means known per se.

The drying is preferably carried out by spray drying. For this purpose, use can be made of any appropriate spray dryer, in particular a turbine, nozzle, liquid pressure or dual fluid spray dryer.

In general, when the filtration is carried out using a filter press, a turbine spray dryer or nozzle spray dyer is used and when the filtration is carried out using a vacuum filter, a turbine spray dryer is used.

It should be observed that the filter cake is not always in a condition allowing spray drying, particularly due to its high viscosity. In a manner known per se, this cake is subjected to a disintegration operation. This operation can be carried out mechanically, by passing the cake through a colloidal grinder or ball mill. The disintegration is generally carried out in the presence of an aluminum compound, in particular sodium aluminate and, optionally, in the presence of an acidifying agent as described above in the latter case, the aluminum compound and the acidifying agent are generally added simultaneously). The disintegration operation serves in particular to lower the viscosity of the suspension to be dried later.

When the drying is carried out using a nozzle spray dryer, the silica that may then be obtained is usually in the form of substantially spherical beads.

On completion of the drying, the product recovered may be subjected to a grinding step. The silica that is then likely to be obtained is generally in the form of a powder.

When the drying is carried out using a turbine spray dryer, the silica that may be obtained may be in the form of a powder.

Finally, the dried product (in particular dried by a turbine spray dryer) or ground as indicated above may optionally be subjected to an agglomeration step, which consists for example of a direct compression, a wet granulation (that is with the use of a binder such as water, silica suspension, etc.), an extrusion or, preferably, a dry compaction. When the latter technique is employed, it may be advisable, before the compaction, to deaerate (operation also called pre-densification or degassing) the powdery products in order to remove the air included therein and to ensure a more uniform compaction.

The silica that may then be obtained by this agglomeration step is generally in the form of granules.

The silica powders, like the beads, obtained by the method according to the invention thus offer the advantage, among others, of being converted simply, effectively and economically, to granules, particularly by conventional shaping operations, such as for example a granulation or compaction, without the latter causing any damage liable to mask, or even destroy, the good intrinsic properties attached to these powders or these beads, as may be the case in the prior art when conventional powders are employed.

The preparation method according to the invention serves in particular to obtain precipitated silica which, on the one hand, is highly structured and not friable and, on the other hand, preferably has a particular grain size distribution and/or pore distribution.

In the summary below, the BET specific surface area is determined by the BRUNAUER-EMMETT-TELLER method described in "The Journal of the American Chemical Society", vol. 60, page 309, February 1938 and corresponding to international standard ISO 5794/1 (Annex D).

The CTAB specific surface area is the outer surface area determined to standard NF T 45007 (November 1987) (5.12).

The DOP oil intake is determined according to standard NF T 30-022 (March 1953) using dioctylphthalate.

The pH is measured according to standard ISO 787/9 (pH of a 5% suspension in water).

The XDC grain-size analysis method by centrifugal sedimentation, used to measure, on the one hand, the widths of the object size distribution of the silica and, on the other hand, the XDC mode illustrating its object size, is described below:

Equipment Required

BI-XDC (BROOKHAVEN-INSTRUMENT X DISC CENTRIFUGE) centrifugal sedimentation granulometer sold by Brookhaven Instrument Corporation), 50 ml tall beaker 50 ml graduated cylinder Branson 1500 watts ultrasonic probe, without nozzle, diameter 13 mm, permuted water ice-filled chiller magnetic stirrer Measurement Conditions DOS 1.35 version of the software (supplied by the granulometer manufacturer)

fixed mode speed of rotation analysis time: 120 minutes specific gravity (silica): 2.1 volume of suspension required 15 ml

Sample Preparation

Add 3.2 g of silica and 40 ml of permuted water to the tall beaker.

Place the beaker containing the suspension in the ice-filled chiller.

Immerse the ultrasonic probe in the beaker.

Disaggregate the suspension for 16 minutes using the BRANSON 1500 watts probe (used to 60% of its maximum capacity).

When the disaggregation is complete, place the beaker on a magnetic stirrer.

Granulometer Preparation

Turn on the instrument and allow it to warm up for 30 minutes.

Rinse the disk twice with permuted water.

Introduce 15 ml of sample to be analyzed in the disk and start stirring.

Enter the abovementioned measurement conditions in the software.

Take the measurements.

When the measurements have been taken:

Stop the rotation of the disk

Rinse, the disk with permuted water several times.

Turn off the instrument.

Results

In the instrument log, record the values of diameters passing 16%, 50% (or median) and 84% (weight %) and the Mode value (the derivative of the cumulative grain size distribution curve gives a frequency curve of which the peak x-axis value (x-axis of the main population) is called the Mode).

The object size distribution width Pd, measured by XDC grain-size analysis, after the ultrasonic disaggregation (in water) corresponds to the ratio (d84−d16)/d50 in which dn is the size for which there are n % of particles (by weight) smaller than this size (hence the distribution width Ld is calculated on the cumulative grain size distribution curve, considered as a whole).

The size distribution width L'd of objects smaller than 500 nm, measured by XDC grain-size analysis, after ultrasonic disaggregation (in water), corresponds to the ratio (d84−d16)/d50 in which dn is the size for which there are n % of particles (by weight), with regard to the particles smaller than 500 nm, which are smaller than this size (hence the distribution width L'd is calculated on the cumulative grain-size distribution curve, cut above 500 nm).

Furthermore, using this XDC-grain-size analysis method by centrifugal settling, it is possible to measure an average size (by weight) of the particles (that is of the secondary particles or aggregates), denoted $d_w$, after dispersion, by ultrasonic disaggregation of the silica in water. The method differs from the one previously described in the fact that the suspension formed (silica+permuted water) is disaggregated, on the one hand, for 8 minutes, and on the other hand, using a Vibracell 1.9 cm ultrasonic probe (sold by Bioblock) of 1500 watts (used at 60% of maximum capacity). After analysis (settling for 120 minutes) the particle size mass distribution is calculated by the grain-size analysis software. The geometric mean by weight, of the particle size (Xg in the software), denoted $d_w$, is calculated by the software from the following equation:

$$\log d_w = (\Sigma(i=1 \text{ to } i=n) m_i \log d_i / \Sigma(i=1 \text{ to } i=n) m_i,$$

where $m_i$ is the mass of all the objects in the size class $d_i$.

The pore volumes given are measured by mercury porosimetry; each sample is prepared as follows: each sample is previously dried for 2 hours in an oven at 200° C., and then placed in a test container within 5 minutes after leaving the oven and vacuum-degasified, for example using a rotary distributor pump; the pore diameters (Micrometrics Auto-Pore III 9420 porosimeter) are calculated by the Washburn equation with a theta contact angle of 140° C. and a gamma surface tension 484 Dynes/cm (or N/m).

$V_{(d5-d50)}$ denotes the pore volume consisting of the pores with diameters between d5 and d50, and $V_{(d5-d100)}$ is the pore volume consisting of the pores with diameters between d5 and d100, dn here being the pore diameter for which n % of the total area of all of the cores is provided by the pores larger than this diameter (the total area of the pores ($S_0$) can be determined from the mercury intrusion curve).

The pore distribution width ldp is obtained from the pore distribution curve, pore volume (ml/g) as a function of the pore diameter (nm): the coordinates of the point S are recorded, corresponding to the main population, that is the values of the diameter (nm) $X_S$ and the pore volume (ml/g) $Y_S$; a line is plotted having equation $Y=Y_S/2$; this line intersects the pore distribution curve at two points A and B having $X_A$ and $X_B$ respectively on either side of $X_S$ for the x-axis (nm); the pore distribution width ldp is equal to the ratio of $(X_A-X_B)/X_S$.

In certain cases, the aptitude to dispersion (and to disaggregation) of the silica obtained by the inventive method can be quantified by means of specific disaggregation tests.

One of the disaggregation tests is performed by the following procedure:

the cohesion of the aggregates is assessed by a grain size measurement (by laser diffraction) carried out on a suspension of silica previously disaggregated by ultrasonication; the aptitude of the silica to disaggregation is thus measured (fracture of objects between 0.1 and a few tens of microns). Ultrasonic disaggregation is carried out using a Vibracell Bioblock 600 W) sonicator, equipped with a 19 mm diameter probe. The grain size measurement is taken by laser diffraction on a Sympatec grain-size analyzer.

2 grams of silica are weighed in a pillbox (height: 6 cm and diameter: 4 cm), and made up to 50 g by adding permuted water: this produces an aqueous suspension containing 4% silica which is homogenized for 2 minutes by magnetic stirring. The ultrasonic disaggregation is then carried out as follows: with the probe immersed to a length of 4 cm, the power output is adjusted to obtain a power dial needle deviation and heading 20%. The disaggregation is carried out for 420 seconds. The grain size measurement is then taken after having introduced a known volume of homogenized suspension (expressed in ml) into the cell of the grain-size analyzer.

The value of the median diameter $Ø_{50S}$ (or Sympatec median diameter) obtained is lower if the silica has a high aptitude to disaggregation. It is also possible to determine the ratio (10×volume of suspension introduced (in ml))/ optical density of the suspension detected by the grain-size analyzer (this optical density is about 20). This ratio indicates the proportion of particles smaller than 0.1 μm which are not detected by the grain-size analyzer. This ratio is called the (Sympatec) ultrasonic disaggregation factor ($F_{DS}$).

Another disaggregation test is performed by the following procedure:

the cohesion of the aggregates is assessed by a grain size measurement (by laser diffraction) carried out on a suspension of silica previously disaggregated by ultrasonication; the aptitude of the silica to disaggregation is thus measured (fracture of objects between 0.1 and a few tens of microns). Ultrasonic disaggregation is carried out using a Vibracell Bioblock 600 W) sonicator, used at 80% of maximum capacity, equipped with a 19 mm diameter probe. The grain size measurement is taken by laser diffraction on a Malvern (Mastersizer 2000) grain-size analyzer.

1 gram of silica is weighed in a pillbox (height: 6 cm and diameter: 4 cm), and made up to 50 g by adding permuted water: this produces an aqueous suspension containing 2% silica which is homogenized for 2 minutes by magnetic stirring. The disaggregation is carried out for 420 seconds. The grain size measurement is then taken after having introduced a known volume of homogenized suspension into the cell of the grain-size analyzer.

The value of the median diameter $Ø_{50M}$ (or Malvern median diameter) obtained is lower if the silica has a high aptitude to disaggregation. It is also possible to determine the ratio (10×value of blue laser darkening)/value of red laser darkening. This ratio indicates the proportion of particles smaller than 0.1 μm. This ratio is called the (Malvern) ultrasonic disaggregation factor ($F_{DM}$).

The Sears number is determined by the method described by G. W. Sears in an article in "Analytical Chemistry, Vol. 28, No. 12, December 1956" entitled "Determination of specific surface area of colloidal silica by titration with sodium hydroxide".

The Sears number is the volume of 0.1 M sodium hydroxide solution required to raise the pH of a 10 g/l silica suspension in 200 g/l sodium chloride medium from 4 to 9.

For this purpose, using 400 g of sodium chloride, a 200 g/l sodium chloride solution is prepared, acidified to pH 3 with a 1 M hydrochloric acid solution. The weighings are performed using a Mettler precision balance. 150 ml of this sodium chloride solution is added delicately to a 250 ml beaker into which a mass N (in g) of the sample to be analyzed has been introduced, corresponding to 1.5 grams of dry silica. Ultrasound is applied to the dispersion obtained for 8 minutes (Branson 1500 W ultrasonic probe, amplitude 60%, diameter 13 mm), the beaker being placed in an ice-filled chiller. The solution obtained is then homogenized by magnetic stirring, using a magnetic rod measuring 25 mm×5 mm. It is checked that the pH of the suspension is lower than 4, if necessary by adjusting with a 1 M hydrochloric acid solution. A Metrohm titrating pH meter (titroprocessor 672, dosimat 655), previously calibrated with pH 7 and pH 4 buffer solutions, is used to add a 0.1 M sodium hydroxide solution at a rate of 2 ml/min. (The titrating pH meter has been programmed as follows: 1) Called the "Get pH" program, 2) Enter the following parameters; pause (pause before start of titration): 3 s, reactant flow rate: 2 ml/min, anticipation (adaptation of the titration rate to the slope of the pH curve): 30, stop pH: 9.40, critical EP (detection sensitivity at equivalence point): 3, report (in parameters of the titration ratio): 2, 3, 5 (that is creation of a detailed report, list of measurement points, titration curve)). The exact volumes $V_1$ and $V_2$ of the sodium hydroxide solution added to obtain a pH of 4 and a pH of 9 respectively are determined by interpolation. The Sears number for 1.5 grams of dry silica is equal to $((V_2-V_1)\times 150)/(ES\times M)$, where:

$V_1$: volume of 0.1 M sodium hydroxide solution at pH=4
$V_2$: volume of 0.1 M sodium hydroxide solution at pH=9
M: mass of sample (g)
DE: dry extract in %

The inventive method, in particular according to the preferred embodiment of the invention, serves to prepare a precipitated silica having:
- a CTAB specific surface area ($S_{CTAB}$) of between 40 and 525 m$^2$/g,
- a BET specific surface area ($S_{BET}$) of between 45 and 550 m$^2$/g,
- a width Ld ((d84−d16)/d50) of object size distribution measured by XDC grain-size analysis after ultrasonic disaggregation of at least 0.91, in particular at least 0.94, and
- a pore volume distribution such that the ratio $V_{(d5-d50)}/V_{(d5-d100)}$ is at least 0.66, in particular at least 0.68.

This silica has for example:
- a width Ld ((d84−d16)/d50) of object size distribution measured by XDC grain-size analysis after ultrasonic disaggregation of at least 1.04 and
- a pore volume distribution such that the ratio $V_{(d5-d50)}/jV_{(d5-d100)}$ at least 0.71.

This silica may have a ratio of $V_{(d5-d50)}/V_{(d5-d100)}$ of at least 0.73, in particular of at least 0.74. This ratio may be at least 0.78, in particular at least 0.80, or even at least 0.84.

The inventive method, in particular according to the preferred embodiment of the invention, serves also to prepare a precipitated silica having:
- a CTAB specific surface area ($S_{CTAB}$) of between 40 and 525 m$^2$/g,
- a BET specific surface area ($S_{BET}$) of between 45 and 550 m$^2$/g,
- a pore distribution width ldp higher than 0.70, in particular higher than 0.80, in particular higher than 0.85.

This silica may have a pore distribution, width ldp higher than 1.05, for example higher than 1.25 or even 1.40.

This silica preferably has an object size distribution width Ld ((d84−d16)/d50) measured by XDC grain-size analysis after ultrasonic disaggregation of at least 0.91, in particular at least 0.94, for example at least 1.0.

The inventive method, in particular according to the preferred embodiment of the invention also serves to prepare a precipitated silica having:
- a CTAB specific surface area ($S_{CTAB}$) of between 40 and 525 m$^2$/g,
- a BET specific surface area ($S_{BET}$) of between 45 and 550 m$^2$/g,
- a width Ld ((d84−d16)/d50) of object size distribution lower than 500 nm, measured by XDC grain-size analysis after ultrasonic disaggregation of at least 0.95 and
- a pore volume distribution such that the ratio $V_{(d5-d50)}/V_{(d5-d100)}$ is at least 0.71.

This silica may have a ratio of $V_{(d5-d50)}/V_{(d5-d100)}$ of at least 0.73, in particular of at least 0.74. This ratio may be at least 0.78, in particular at least 0.80, or even at least 0.84.

The inventive method, in particular according to the Preferred embodiment of the invention, serves also to prepare a precipitated silica having:
- a CTAB specific surface area ($S_{CTAB}$) of between 40 and 525 m$^2$/g,
- a BET specific surface area ($S_{BET}$) of between 45 and 550 m$^2$/g,
- a width L'd ((d84−d16)/d50) of object size distribution lower than 500 nm, measured by XDC grain-size analysis after ultrasonic disaggregation of at least 0.90, in particular at least 0.92 and
- a pore volume distribution such that the ratio $V_{(d5-d50)}/V_{(d5-d100)}$ is at least 0.74.

This silica may have a ratio of $V_{(d5-d50)}/V_{(d5-d100)}$ of at least 0.78, in particular at least 0.80, or even at least 0.84.

In these silicas which can be prepared by the method according to the preferred embodiment of the invention, the pore volume provided by the largest pores normally accounts for the majority of the structure.

They may have both an object size distribution width Ld of at least 1.04 and a size distribution width L'd of objects (smaller than 500 nm) of at least 0.95.

The object size distribution width Ld of these silicas may in certain cases be at least 1.10, in particular at least 1.20; it may be at least 1.30, for example at least 1.50, or even at least 1.60.

Similarly, the size distribution width L'd of objects (smaller than 500 nm) may for example be at least 1.0, in particular be at least 1.10, in particular at least 1.20.

In general, these silicas have a particular surface chemistry, such as to have a ratio (Sears number×1000)/(BET specific surface area ($S_{BET}$)) lower than 60, preferably lower than 55, for example lower than 50.

They generally have a high and therefore atypical object size, which may be such that the mode of the grain size distribution measured by XDC grain-size analysis after ultrasonic disaggregation in water) meets the condition: XDC mode (nm) ∃ (5320/$S_{CTAB}$ (m$^2$/g))+8, or even the condition: XDC mode (nm) ∃ (5320/$S_{CTAB}$ (m$^2$/g))+10.

They may for example have a poor volume ($V_{80}$) consisting of the pores having diameters between 3.7 and 80 nm of at least 1.35 cm$^3$/g, in particular at least 1.40 cm$^3$/g, or even at least 1.50 cm$^3$/g.

Their median diameter ($\emptyset_{50\ S}$), after ultrasound disaggregation, is generally lower than 8.5 μm; it may be lower than 6.0 μm, for example lower than 5.5 μm.

Similarly, their median diameter ($\emptyset_{50\ M}$), after ultrasonic disaggregation, is generally lower than 8.5 μm; it may be lower than 6.0 μm, for example lower than 5.5 μm.

These silicas may have an ultrasonic disaggregation factor ($F_{DS}$) higher than 3 ml, in particular higher than 3.5 ml, in particular higher than 4.5 ml.

Their ultrasonic disaggregation factor ($F_{DM}$) may be higher than 6, in particular higher than 7, in particular higher than 11.

They have for example an average particle size (by mass) measured by XDC grain-size analysis after ultrasonic disaggregation, $d_w$, of between 20 and 300 nm in particular between 30 and 300 nm in particular between 40 and 160 nm.

They may have a particle size distribution such that $dw \geq (16500/S_{CTAB}) - 30$.

According to one embodiment, the silicas prepared by the invention generally have a CTAB specific surface area ($S_{CTAB}$) of between 60 and 330 m²/g, in particular between 60 and 290 m²/g.

a BET specific surface area ($S_{BET}$) of between 70 and 350 m²/g, in particular between 90 and 320 m²/g.

Their CTAB specific surface area may be between 90 and 230 m²/g.

Similarly, their SET specific surface area may be between 110 and 270 m²/g, in particular between 115 and 250 m²/g, for example between 135 and 235 m²/g.

According to another embodiment, the silicas prepared by the invention generally have:

a CTAB specific surface area ($S_{CTAB}$) of between 40 and 380 m²/g, in particular between 45 and 250 m²/g, a BET specific surface area ($S_{BET}$) of between 45 and 400 m²/g, in particular between 50 and 300 m²/g.

Their CTAB specific surface area may be between 115 and 260 m²/g, in particular between 145 and 260 m²/g.

Similarly, their SET specific surface area may be between 120 and 280 m²/g, in particular between 150 and 280 m²/g.

The silicas prepared by the present invention may have a certain microporosity; thus, these silicas are normally such that $(S_{BET} - S_{CTAB}) \geq 5$ m²/g, preferably $\geq 15$ m²/g, for example $\geq 25$ m²/g.

This microporosity is generally not too high; these silicas are generally such that $(S_{BET} - S_{CTAB}) < 50$ m²/g, preferably $< 40$ m²/g.

The pH of the silicas obtained by the invention is normally between 6.3 and 7.8, in particular between 6.6 and 7.5.

They have a DOP oil intake which usually varies between 220 and 330 ml/100 g, for example between, 240 and 300 ml/100 g.

They may be in the form of substantially spherical beads having an average size of at least 50 μm.

This average bead size may be at least 100 μm, for example at least 150 μm; it is generally at least no more than 300 μm and is preferably between 100 and 270 μm. This average size is determined according to standard NF X 11507 (December 1970) by dry screening and determination of the diameter corresponding to an oversize of 50%.

They may also be in the form of a powder having an average size of at least 15 μm; this is for example between 15 and 60 μm, (in particular between 20 and 45 μm) or between 30 and 150 μm (in particular between 45 and 120 μm).

They may also be in the form of granules having a size of at least 1 mm, in particular between 1 and 10 mm, according to their major axis (length).

The silicas prepared by the inventive methods, in particular according to the preferred embodiment of the invention, may have an advantageous application for reinforcing polymers, natural or synthetic.

The polymer(s) compositions in which they can be used, as reinforcing filler, are generally based on one or more polymers or copolymers, in particular one or more elastomers, in particular thermoplastic elastomers, preferably having at least a glass transition temperature of between −150 and 4-300° C., for example between −150 and +20° C.

As possible polymers, mention can be made of dienic polymers, in particular dienic elastomers, for example polybutadienes (BR), polyisoprenes (IR), styrene-butadiene copolymers (SBR, in particular ESBR (emulsion) or SSBR (solution)). Mention, can also be made of natural rubber (NR).

The polymer(s) compositions can be vulcanized with sulfur or crosslinked in particular with peroxides.

In general, the polymer(s) compositions further comprise at least one coupling agent (silica/polymer).

As coupling agent, use can be made in particular, as nonlimiting examples, of a polysulfide silane (called "symmetrical" or "asymmetrical", such as monoethoxydimethylsilylpropyl tetrasulfide.

The proportion by weight of silica in the polymer(s) composition normally accounts for 20 to 80%, for example 30 to 70%, of the quantity of polymer(s).

The silica prepared by the inventive method may constitute all the reinforcing filler of the polymer(s) composition.

Optionally, another reinforcing filler can be combined with the silica, such as in particular a commercial highly dispersible silica such as for example Z1165MP silica, Z1115MP silica, another reinforcing inorganic filler such as for example alumina, or even a reinforcing organic filler, such as carbon black.

Mention can be made as nonlimiting examples of finished articles based on the polymer(s) compositions described above (in particular based on corresponding vulcanizers) of shoe soles, tires, flooring materials, gas barriers, fireproofing materials, and also technical parts such as skilift, rollers, seals of home appliances, liquid or gas line gaskets, seals of brake systems, sheaves, cables and transmission belts.

The silicas prepared by the inventive method can also be employed as a catalyst support, as absorbent of active materials (in particular liquid support, for example, used in foods, such as vitamins (vitamin E), choline chloride), as viscosifying, texturizing or anti caking agents, as elements for battery separators, as toothpaste and paper additives.

The following examples illustrate the invention but without limiting its scope.

EXAMPLE 1

A method comprising the following steps is implemented;
a precipitation reacting using sodium silicate and sulfuric acid, a filtration-washing step, using a filter press,
drying by means of a turbine spray dryer.

Figure 1:
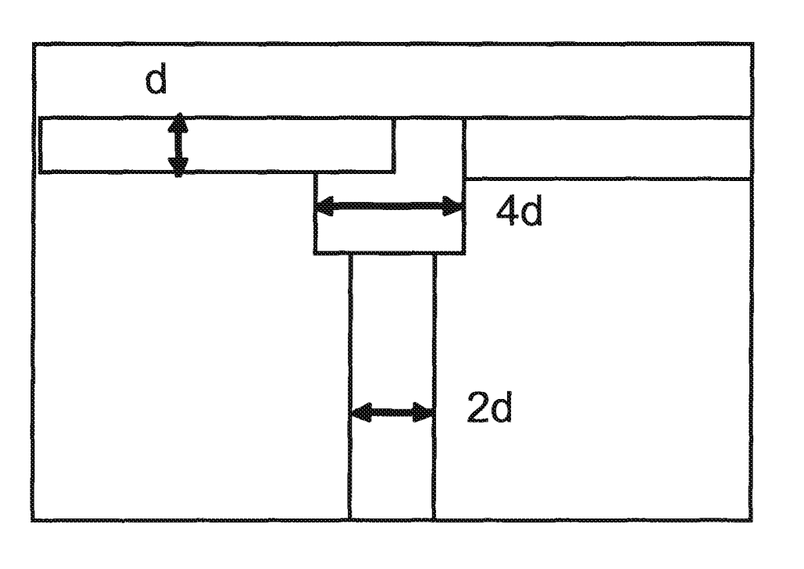
FIG. 1 shows a tangential jet blender comprising a chamber, with an inside diameter equal to 4 d, having two tangential inlet tubes, with an inside diameter d, and an axial outlet tube, with an inside diameter of 2 d.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2/Na_2O$ weight ratio 3.45), having a concentration of 50 g/L and a temperature of 77° C., at a flow rate of 377 L/h, is added to the fast blender for 8 minutes and 30 seconds, simultaneously with sulfuric acid, having a concentration of 21 g/L and a temperature of 77° C., at a flow rate regulated in order to maintain the pH of the reaction medium at a value of 4.0.

This reaction medium is accommodated in the stirred vessel, into which a sodium silicate solution is introduced simultaneously at a flow rate regulated in order to maintain the pH of the reaction medium at a value of 4.2. The temperature is increased to 84° C.

After 8 minutes and 30 seconds of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 35 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 3.9 in 5 minutes by sulfuric acid having a concentration of 80 g/L.

The slurry obtained is filtered and washed on a filter press (dry extract of the cake 20%). After dilution, the cake obtained is mechanically disintegrated, adding sodium aluminate ($Na_2O/Al_2O_3$ weight ratio 0.8), in an $Al/SiO_2$ ratio of 0.3% and sulfuric acid until a pH of 6.5 is reached. The resulting slurry (having a dry extract of 11%) is spray dried using a turbine spray dryer.

EXAMPLE 2

A method comprising the following steps is implemented:
a precipitation reacting using sodium silicate and sulfuric acid,
a filtration-washing step, using a filter press,
drying by means of a turbine spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2Na_2O$ weight ratio 3.45), having a concentration of 50 g/L and a temperature of 79° C., at a flow rate of 458 L/h, is added to the fast blender for 7 minutes, simultaneously with sulfuric acid, having a concentration of 21 g/L and a temperature of 79° C., at a flow rate regulated in order to maintain the pH of the reaction medium at a value of 4.6.

This reaction medium is accommodated in the stirred vessel, into which a sodium silicate solution is introduced simultaneously at a flow rate regulated in order to maintain the pH of the reaction medium at a value of 4.3. The temperature is increased to 81° C.

After 7 minutes of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 34 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 3.9 in 5 minutes by sulfuric acid having a concentration of 80 g/L.

The slurry obtained is filtered and washed on a filter press (dry extract of the cake 20%). After dilution, the cake obtained is mechanically disintegrated, adding sodium aluminate ($Na_2O/Al_2O_3$ weight ratio 0.8), in an $Al/SiO_2$ ratio of 0.3% and sulfuric acid until a pH of 6.5 is reached. The resulting slurry (having a dry extract of 11%) is spray dried using a turbine spray dryer.

EXAMPLE 3

A method comprising the following steps is implemented:
a precipitation reacting using sodium silicate and sulfuric acid,
a filtration-washing step, using a filter press,
drying by means of a turbine spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2/Na_2O$ weight ratio 3.45), having a concentration of 50 g/L and a temperature of 82° C., at a flow rate of 382 L/h, is added to the fast blender for 8 minutes and 30 seconds, simultaneously with sulfuric acid, having a concentration of 21 g/L and a temperature of 82° C., at a flow rate regulated in order to maintain the pH of the reaction medium at a value of 3.1.

This reaction medium is accommodated in the stirred vessel, into which a sodium silicate solution is introduced simultaneously at a flow rate regulated in order to maintain the pH of the reaction medium at a value of 4.3. The temperature is increased to 82° C.

After 8 minutes and 30 seconds of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 34 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 3.9 in 5 minutes by sulfuric acid having concentration of 80 g/L.

The slurry obtained is filtered and washed on a filter press (dry extract of the cake 21%). After dilution, the cake obtained is mechanically disintegrated, adding sodium aluminate ($Na_2/Al_2O_3$ weight ratio 0.8), in an $Al/SiO_2$ ratio of 0.3% and sulfuric acid until, a pH of 6.5 is reached. The resulting slurry (having a dry extract of 11%) is spray dried using a turbine spray dryer.

EXAMPLE 4

A method comprising the following steps is implemented:
a precipitation reacting using sodium silicate and sulfuric acid,
a filtration-washing step, using a filter press,
drying by means of a turbine spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2/Na_2O$ weight ratio 3.45), having a concentration of 50 g/L and a temperature of 79° C., at a flow rate of 321 L/h is added to the fast blender for 10 minutes, simultaneously with sulfuric acid, having a concentration of 21 g/L and a temperature of 79° C., at a flow rate regulated in order to maintain the pH of the reaction medium at a value of 4.6.

This reaction medium is accommodated in the stirred vessel, into which a sodium silicate solution is introduced simultaneously at a flow rate regulated in order to maintain the pH of the reaction medium at a value of 4.4. The temperature is increased to 81° C.

After 10 minutes of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 34 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 3.9 in 5 minutes by sulfuric acid having a concentration of 80 g/L.

The slurry obtained is filtered and washed on a filter press (dry extract of the cake 20%). After dilution, the cake obtained is mechanically disintegrated, adding sodium aluminate ($Na_2O/Al_2O_3$ weight ratio 0.8), in an $Al/SiO_2$ ratio of 0.3% and sulfuric acid until a pH of 6.5 is reached. The resulting slurry (having a dry extract of 11%) is spray dried using a turbine spray dryer.

EXAMPLE 5

A method comprising the following steps is implemented:
a precipitation reacting using sodium silicate and sulfuric acid,
a filtration-washing step, using a filter press,
drying by means of a nozzle spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2Na_2O$ weight ratio 3.45), having a concentration of 50 g/L and a temperature of 82° C., at a flow rate of 384 L/h, is added to the fast blender for 8 minutes and 30 seconds, simultaneously with sulfuric acid, having a concentration of 21 g/L and a temperature of 82° C., at a flow rate regulated in order to maintain the pH of the reaction medium at a value of 4.0.

This reaction medium is accommodated in the stirred vessel, into which a sodium silicate solution is introduced simultaneously at a flow rare regulated in order to maintain the pH of the reaction medium at a value of 4.4. The temperature is increased to 82° C.

After 8 minutes and 30 seconds of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid, is carried out for 40 minutes in the stirred vessel, with a sodium silicate, flow rate of 35 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 4.0 in 5 minutes by sulfuric acid having a concentration of 80 g/L.

The slurry obtained is filtered and washed on a filter press (dry extract of the cake 20%). After dilution, the cake obtained is mechanically disintegrated adding sodium aluminate ($Na_2O/Al_2O_3$ weight ratio 0.8), in an $Al/SiO_2$ ratio of 0.3% and sulfuric acid until a pH of 6.5 is reached. The resulting slurry (having a dry extract of 18.6%) is spray dried by means of a nozzle spray dryer.

EXAMPLE 6

A method comprising the following steps is implemented:
a precipitation reacting using sodium silicate and sulfuric acid,
a filtration-washing step, using a filter press,
drying by means of a turbine spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution ($SiO_2/Na_2O$ weight ratio 3.45), having a concentration of 50 g/L and a temperature of 78° C., at a flow rate of 376 L/h, is added to the fast blender for 8 minutes and 30 seconds, simultaneously with sulfuric acid, having a concentration of 21 g/L and a temperature of 78° C., at a flow rate regulated in order to maintain the pH of the reaction medium at a value of 3.9.

This reaction medium is accommodated in the stirred vessel, into which a sodium silicate solution is introduced simultaneously at a flow rate regulated in order to maintain the pH of the reaction medium at a value of 4.1. The temperature is increased to 85° C.

After 8 minutes and 30 seconds of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 33 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 3.9 in 5 minutes by sulfuric acid having a concentration of 80 g/L.

The slurry obtained is filtered and washed on filter press (dry extract of the cake 20%). After dilution, the cake obtained is mechanically disintegrated, adding sodium aluminate ($Na_2O/Al_2O_2$ weight ratio 0.8), in an $Al/SiO_2$ ratio of 0.3% and sulfuric acid until a pH of 6.5 is reached. The resulting slurry (having a dry extract of 11%) is spray dried using a turbine spray dryer.

EXAMPLE 7

A method comprising the following steps is implemented:
a precipitation reacting using sodium silicate and sulfuric acid,
a filtration-washing step, using a filter press,
drying by means of a turbine spray dryer.

The silica precipitation reaction is carried out by sequencing a Hartridge-Roughton type stainless steel fast blender, with an inlet diameter d of 5 mm (FIGURE), and a stirred (160 rpm) stainless steel vessel having a volume of 170 L, in the following steps.

A sodium silicate solution $SiO_2/Na_2O$ weight ratio 3.45), having a concentration of 50 g/L and a temperature of 86° C., at a flow rate of 376 L/h, is added to the fast blender for 8 minutes and 30 seconds, simultaneously with sulfuric acid, having a concentration of 21 g/L and a temperature of 86° C., at a flow rate regulated in order to maintain the pH of the reaction medium at a value of 3.9.

This reaction medium is accommodated in the stirred vessel, into which a sodium silicate solution is introduced simultaneously at a flow rate regulated in order to maintain the pH of the reaction medium at a value of 4.1. The temperature is increased to 86° C.

After 8 minutes and 30 seconds of simultaneous addition, the feeds of the fast blender are interrupted and a sodium silicate solution is introduced into the stirred vessel until pH value of 8.0 is obtained. The temperature is increased to 92° C. and maintained at this level until the end of the reaction.

A new simultaneous addition of sodium silicate and sulfuric acid is carried out for 40 minutes in the stirred vessel, with a sodium silicate flow rate of 32 L/h, in a concentration of 235 g/L, and a sulfuric acid flow rate, having a concentration of 80 g/L, regulated in order to maintain the pH of the reaction medium at a value of 8.0.

On completion of this second simultaneous addition, the reaction medium is adjusted to a pH of 4.0 in 5 minutes by sulfuric acid having a concentration of 80 g/L.

The slurry obtained is filtered and washed on a filter press (dry extract of the cake 20%). After dilution, the cake obtained is mechanically disintegrated, adding sodium aluminate ($Na_2/Al_2O_3$ weight ratio 0.8), in an $Al/SiO_2$ ratio of 0.3% and sulfuric acid until a pH of 6.5 is reached. The resulting slurry (having a dry extract of 11%) is spray dried using a turbine spray dryer.

The methods exemplified above have a very satisfactory silica productivity.

The invention claimed is:

1. A method for preparing precipitated silica product wherein the method comprises:
   (A) reacting a silicate with an acidifying agent to obtain a suspension of precipitated silica, wherein step (A) comprises:
      (i) forming a reaction medium by simultaneously adding silicate and acidifying agent to a fast blender, while maintaining the pH of the reaction medium ($pH_1$) from 2 to 5.5, where the addition is performed without the addition of an electrolyte and the reaction medium has a residence time in said fast blender,
      (ii) introducing the reaction medium issuing from step (i) into a stirred reactor, the pH of the reaction medium ($pH_2$) in said reactor being regulated from 2 to 5.5, optionally with $pH_2 \geq pH_1$,
      (iii) adding silicate to the reaction medium in said stirred reactor until the pH value of the reaction mixture ranges from 7 to 10,
      (iv) simultaneously adding silicate and acidifying agent to said reaction medium in the stirred reactor after step (iii), and maintaining the pH of said reaction medium from 7 to 10,
      (v) stopping the silicate addition in step (iv) while continuing to add acidifying agent to the reaction medium in the stirred reactor until the pH value of the reaction medium in the stirred reactor is less than 6 to produce a suspension of precipitated silica; and
   (B) separating said precipitated silica from said suspension and drying the separated precipitated silica to obtain a precipitated silica product,
   wherein step (i) is performed at a temperature of between 70° C. and 95° C. and wherein no initial bottoms are present in the reactor of step (ii) before the introduction of the reaction medium issuing from step (i).

2. The method as defined by claim 1, wherein the simultaneous addition of said silicate with said acidifying agent in step (i) is carried out in continuous mode.

3. The method as defined by claim 1, wherein said reactor operates in semi-continuous mode.

4. The method as defined by claim 1, wherein the simultaneous addition of said silicate with said acidifying agent in step (i) is carried out in a fast blender selected from the group consisting of symmetrical T or Y blenders or tubes, asymmetrical T or Y blenders or tubes, tangential jet blenders, Hartridge-Roughton blenders, vortex blenders, and rotor-stator blenders.

5. The method as defined by claim 1, wherein the simultaneous addition of said silicate with said acidifying agent in step (i) is carried in a tangential jet blender, a Hartridge-Roughton blender or a vortex blender which comprises a chamber having at least two tangential inlets via which the silicate and acidifying agent are separately introduced, and an axial outlet via which the reaction medium exits.

6. The method as defined by claim 5, wherein said at least two tangential inlets are located symmetrically, and in opposition, about the centerline of said chamber.

7. The method as defined by claim 1, wherein, in step (ii), to regulate the pH of the reaction medium ($pH_2$) in the reactor from 2 to 5.5, acidifying agent or, optionally, silicate or a basifying agent, is added simultaneously to the reaction mixture issuing from step (i).

8. The method as defined by claim 1, wherein the $pH_1$ and $pH_2$ range from 2.5 to 5.

9. The method as defined by claim 1, wherein $pH_2 \geq pH_1$.

10. The method as defined by claim 1, wherein the entire precipitation is carried out at a temperature ranging from 70° C. to 95° C.

11. The method as defined by claim 1, wherein the temperature of the reaction medium ranges from 70° C. to 86° C. during steps (i) and (ii).

12. The method as defined by claim 1, wherein the temperature of the reaction medium is increased during step (iii) to a value of from 85° C. to 95° C., and then maintained at this value during steps (iv) and (v).

13. The method as defined by claim 1, wherein said fast blender is a tangential jet blender, a Hartridge-Roughton blender or a vortex blender, comprising a chamber having at least two tangential inlets via which the silicate and acidifying agent are separately but simultaneously introduced in step (i), and an axial outlet via which the reaction medium exits, the at least two tangential inlets optionally being located symmetrically about the centerline of said chamber.

14. The method as defined by claim 1, wherein the residence time through the fast blender is shorter than 1 second.

15. The method as defined by claim 1, wherein the drying is carried out by spray drying.

16. The method as defined by claim 1, wherein the separation comprises a filtration carried out employing a filter press.

17. The method as defined by claim 1, wherein the separation comprises a filtration carried out employing a nozzle spray dryer.

18. The method as defined by claim 1, wherein the separation comprises a filtration carried out employing a vacuum filter.

19. The method as defined by claim 1, wherein the separation comprises a filtration carried out employing a turbine spray dryer.

20. The method as defined by claim 1, wherein the precipitated silica product has:
   a CTAB specific surface area ($S_{CTAB}$) of from 40 to 525 m²/g,
   a BET specific surface area ($S_{BET}$) of from 45 to 550 m²/g,
   a width Ld ((d84−d16)/d50) of object size distribution measured by XDC grain-size analysis after ultrasonic disaggregation of at least 0.91, and
   a pore volume distribution such that the ratio $V_{(d5-d50)}/V_{(d5-d100)}$ is at least 0.66.

21. The method as defined by claim 1, wherein the precipitated silica product has:
   a CTAB specific surface area ($S_{CTAB}$) of from 40 to 525 m²/g,
   a BET specific surface area ($S_{BET}$) of from 45 and 550 m²/g, and
   a pore distribution width ldp higher than 0.70.

22. The method as defined by claim 1, wherein the precipitated silica product has:
   a CTAB specific surface area ($S_{CTAB}$) of from 40 and 525 m²/g,
   a BET specific surface area ($S_{BET}$) of from 45 and 550 m²/g,
   a width L'd ((d84−d16)/d50) of object size distribution lower than 500 nm, measured by XDC grain size analysis after ultrasonic disaggregation of at least 0.95, and
   a pore volume distribution such that the ratio $V_{(d5-d50)}/V_{(d5-d100)}$ is at least 0.71.

23. The method as defined by claim 1, wherein the precipitated silica product has:
   a CTAB specific surface area ($S_{CTAB}$) of from 40 to 525 m²/g,
   a BET specific surface area ($S_{BET}$) of from 45 to 550 m²/g,
   a width L'd ((d84−d16)/d50) of object size distribution lower than 500 nm, measured by XDC grain size analysis after ultrasonic disaggregation of at least 0.90, and
   a pore volume distribution such that the ratio $V_{(d5-d50)}/V_{(d5-d100)}$ is at least 0.71.

24. The method as defined by claim 1, wherein the precipitated silica product has an object size such that the grain size mode measured by XDC grain-size analysis after ultrasonic disaggregation meets the following condition:

Mode XDC (nm)≥(5320/$S_{CTAB}$ (m²/g))+8.

25. The method as defined by claim 1, wherein the precipitated silica product has:
   a CTAB specific surface area ($S_{CTAB}$) of from 60 to 330 m²/g, and
   a BET specific surface area ($S_{BET}$) of from 70 to 350 m²/g.

26. The method as defined by claim 1, wherein the precipitated silica product has a CTAB specific surface area ($S_{CTAB}$) of from 90 to 230 m²/g and a BET specific surface area ($S_{BET}$) of from 110 to 270 m²/g.

27. The method as defined by claim 1, wherein the precipitated product comprises substantially spherical beads having an average particle size of at least 80 μm.

28. The method as defined by claim 1, wherein the precipitated product comprises a powder having an average particle size of at least 15 μm.

29. The method as defined by claim 1, wherein the precipitated product comprises granules having a particle size of at least 1 mm.

30. A method for preparing precipitated silica product wherein the method comprises:
   (A) reacting a silicate with an acidifying agent to obtain a suspension of precipitated silica, wherein step (A) comprises:
      (i) forming a reaction medium by simultaneously adding silicate and acidifying agent in a zone of turbulent flow, while maintaining the pH of the reaction medium (pH₁) from 2 to 5.5, where the addition is performed without the addition of an electrolyte and the reaction medium has a residence time in the zone of turbulent flow,
      (ii) introducing the reaction medium issuing from step (i) into a stirred reactor, the pH of the reaction medium (pH₂) in said reactor being regulated from 2 to 5.5, optionally with pH₂≥pH₁,
      (iii) adding silicate to the reaction medium in said stirred reactor until the pH value of the reaction mixture ranges from 7 to 10,
      (iv) simultaneously adding silicate and acidifying agent to said reaction medium in the stirred reactor after step (iii), and maintaining the pH of said reaction medium from 7 to 10,
      (v) stopping the silicate addition in step (iv) while continuing to add acidifying agent to the reaction medium in the stirred reactor until the pH value of the reaction medium in the stirred reactor is less than 6 to produce a suspension of precipitated silica; and
   (B) separating said precipitated silica from said suspension and drying the separated precipitated silica to obtain a precipitated silica product,
   wherein step (i) is performed at a temperature of between 70° C. and 95° C. and wherein no initial bottoms are present in the reactor of step (ii) before the introduction of the reaction medium issuing from step (i).

31. The method as defined by claim 30, wherein the residence time in the zone of turbulent flow is shorter than 1 second.

* * * * *